United States Patent
Zuckerman et al.

(10) Patent No.: US 9,707,814 B2
(45) Date of Patent: Jul. 18, 2017

(54) ACTIVE STABILIZATION SYSTEM FOR TRUCK CABINS

(71) Applicant: Levant Power Corporation, Woburn, MA (US)

(72) Inventors: Richard Anthony Zuckerman, Somerville, MA (US); Clive Tucker, Charlestown, MA (US); Johannes Schneider, Cambridge, MA (US); John Giarratana, Whitman, MA (US)

(73) Assignee: ClearMotion, Inc., Woburn, MA (US)

( * ) Notice: Subject to any disclaimer, the term of this patent is extended or adjusted under 35 U.S.C. 154(b) by 0 days.

(21) Appl. No.: 14/242,658

(22) Filed: Apr. 1, 2014

(65) Prior Publication Data

US 2014/0297113 A1    Oct. 2, 2014

Related U.S. Application Data

(63) Continuation of application No. PCT/US2014/029654, filed on Mar. 14, 2014.

(Continued)

(51) Int. Cl.
*B60G 17/04* (2006.01)
*B60G 17/08* (2006.01)
(Continued)

(52) U.S. Cl.
CPC .......... *B60G 11/265* (2013.01); *B60G 17/015* (2013.01); *B60G 17/0152* (2013.01);
(Continued)

(58) Field of Classification Search
CPC .............. G06F 17/00; B60W 2520/18; B60W 2550/147; B60W 30/02; B60W 40/10;
(Continued)

(56) References Cited

U.S. PATENT DOCUMENTS 998,128 A     7/1911  Smith
1,116,293 A  11/1914  Kane
(Continued)

FOREIGN PATENT DOCUMENTS

CN    1325799 A    12/2001
CN    1370926 A     9/2002
(Continued)

OTHER PUBLICATIONS

Cleasby et al., A novel high efficiency electrohydrostatic flight simulator motion system. Fluid Pow Mot Control. Centre for PTMC, UK. 2008;437-449.
(Continued)

*Primary Examiner* — Thomas G Black
*Assistant Examiner* — Demetra Smith-Stewart
(74) *Attorney, Agent, or Firm* — Wolf, Greenfield & Sacks, P.C.

(57) ABSTRACT

An active suspension system for a truck cabin that actively responds to and mitigates external force inputs between the truck chassis and the cabin. The system greatly reduces pitch, roll, and heave motions that lead to operator discomfort. The assembly is comprised of two or more self-contained actuators that respond to commands from an electronic controller. The controller commands the actuators based on feedback from one or more sensors on the cabin and/or chassis.

48 Claims, 5 Drawing Sheets

Related U.S. Application Data

(60) Provisional application No. 61/913,644, filed on Dec. 9, 2013, provisional application No. 61/865,970, filed on Aug. 14, 2013, provisional application No. 61/815,251, filed on Apr. 23, 2013, provisional application No. 61/789,600, filed on Mar. 15, 2013, provisional application No. 61/930,452, filed on Jan. 22, 2014.

(51) Int. Cl.
| | | |
|---|---|---|
| B60G 17/056 | (2006.01) | |
| B60G 11/26 | (2006.01) | |
| H02K 5/12 | (2006.01) | |
| H02P 6/16 | (2016.01) | |
| B60G 17/015 | (2006.01) | |
| B60G 17/0195 | (2006.01) | |
| H02K 29/08 | (2006.01) | |
| H02K 29/10 | (2006.01) | |
| H02K 7/14 | (2006.01) | |
| H02K 7/18 | (2006.01) | |
| H02K 11/215 | (2016.01) | |
| H02K 11/22 | (2016.01) | |
| H02K 11/33 | (2016.01) | |
| B60G 17/00 | (2006.01) | |

(52) U.S. Cl.
CPC ........... *B60G 17/0195* (2013.01); *H02K 5/12* (2013.01); *H02K 7/14* (2013.01); *H02K 7/1823* (2013.01); *H02K 11/215* (2016.01); *H02K 11/22* (2016.01); *H02K 11/33* (2016.01); *H02K 29/08* (2013.01); *H02K 29/10* (2013.01); *H02P 6/16* (2013.01); *B60G 17/00* (2013.01); *B60G 17/056* (2013.01); *B60G 17/08* (2013.01); *B60G 2400/90* (2013.01)

(58) Field of Classification Search
CPC ... F16F 9/535; F16F 15/00; F16F 9/50; B60G 2300/07; B60T 8/17551; E02F 9/2296
See application file for complete search history.

(56) References Cited

U.S. PATENT DOCUMENTS

| | | | |
|---|---|---|---|
| 1,290,293 | A | 1/1919 | Morski |
| 2,194,530 | A | 3/1940 | Torstensson |
| 2,885,202 | A | 5/1959 | Trumper et al. |
| 2,942,581 | A | 6/1960 | Gaffney |
| 2,958,292 | A | 11/1960 | Lipe et al. |
| 3,507,580 | A | 4/1970 | Howard et al. |
| 3,515,889 | A | 6/1970 | Kammerer |
| 3,540,482 | A | 11/1970 | Fulmer |
| 3,559,027 | A | 1/1971 | Arsem |
| 3,688,859 | A | 9/1972 | Hudspeth et al. |
| 3,800,202 | A | 3/1974 | Oswald |
| 3,803,906 | A | 4/1974 | Ross |
| 3,805,833 | A | 4/1974 | Teed |
| 3,921,746 | A | 11/1975 | Lewus |
| 3,947,004 | A | 3/1976 | Taylor |
| 4,032,829 | A | 6/1977 | Schenavar |
| 4,033,580 | A | 7/1977 | Paris |
| 4,216,420 | A | 8/1980 | Jinbo et al. |
| 4,295,538 | A | 10/1981 | Lewus |
| 4,401,926 | A | 8/1983 | Morton et al. |
| 4,480,709 | A | 11/1984 | Commanda |
| 4,500,827 | A | 2/1985 | Merritt et al. |
| 4,606,551 | A | 8/1986 | Toti et al. |
| 4,625,993 | A | 12/1986 | Williams et al. |
| 4,673,194 | A | 6/1987 | Sugasawa |
| 4,729,459 | A | 3/1988 | Inagaki et al. |
| 4,740,711 | A | 4/1988 | Sato et al. |
| 4,815,575 | A | 3/1989 | Murty |
| 4,857,755 | A | 8/1989 | Comstock |
| 4,868,477 | A | 9/1989 | Anderson et al. |
| 4,872,701 | A | 10/1989 | Akatsu et al. |
| 4,887,699 | A | 12/1989 | Ivers et al. |
| 4,908,553 | A | 3/1990 | Hoppie et al. |
| 4,921,080 | A | 5/1990 | Lin |
| 4,924,393 | A * | 5/1990 | Kurosawa ............... 701/38 |
| 4,936,423 | A | 6/1990 | Karnopp |
| 4,981,309 | A | 1/1991 | Froeschle et al. |
| 4,992,715 | A | 2/1991 | Nakamura et al. |
| 5,034,890 | A | 7/1991 | Sugasawa et al. |
| 5,046,309 | A | 9/1991 | Yoshino |
| 5,060,959 | A | 10/1991 | Davis et al. |
| 5,091,679 | A | 2/1992 | Murty et al. |
| 5,098,119 | A | 3/1992 | Williams et al. |
| 5,102,161 | A | 4/1992 | Williams |
| 5,145,206 | A | 9/1992 | Williams |
| 5,203,199 | A | 4/1993 | Henderson et al. |
| 5,215,327 | A | 6/1993 | Gatter et al. |
| 5,232,242 | A | 8/1993 | Bachrach et al. |
| 5,243,525 | A | 9/1993 | Tsutsumi et al. |
| 5,276,622 | A | 1/1994 | Miller et al. |
| 5,291,960 | A | 3/1994 | Brandenburg et al. |
| 5,295,563 | A | 3/1994 | Bennett |
| 5,295,705 | A | 3/1994 | Butsuen et al. |
| 5,337,560 | A | 8/1994 | Abdelmalek et al. |
| 5,353,840 | A | 10/1994 | Paley et al. |
| 5,360,445 | A | 11/1994 | Goldowsky |
| 5,377,791 | A | 1/1995 | Kawashima et al. |
| 5,391,953 | A | 2/1995 | Van de Veen |
| 5,425,436 | A | 6/1995 | Teramura et al. |
| 5,480,186 | A | 1/1996 | Smith |
| 5,497,324 | A | 3/1996 | Henry et al. |
| 5,529,152 | A | 6/1996 | Hamilton et al. |
| 5,570,286 | A | 10/1996 | Margolis et al. |
| 5,572,425 | A | 11/1996 | Levitt et al. |
| 5,590,734 | A | 1/1997 | Caires |
| 5,608,308 | A | 3/1997 | Kiuchi et al. |
| 5,616,999 | A | 4/1997 | Matsumura et al. |
| 5,657,840 | A | 8/1997 | Lizell |
| 5,659,205 | A | 8/1997 | Weisser et al. |
| 5,682,980 | A | 11/1997 | Reybrouck et al. |
| 5,684,383 | A | 11/1997 | Tsuji et al. |
| 5,701,245 | A | 12/1997 | Ogawa et al. |
| 5,717,303 | A | 2/1998 | Engel |
| 5,764,009 | A | 6/1998 | Fukaya et al. |
| 5,794,168 | A | 8/1998 | Sasaki et al. |
| 5,794,439 | A | 8/1998 | Lisniansky |
| 5,839,800 | A | 11/1998 | Koga et al. |
| 5,844,388 | A | 12/1998 | Maiocchi |
| 5,852,355 | A | 12/1998 | Turner |
| 5,856,709 | A | 1/1999 | Ibaraki et al. |
| 5,892,293 | A | 4/1999 | Lucas |
| 5,941,328 | A | 8/1999 | Lyons et al. |
| 5,944,153 | A | 8/1999 | Ichimaru |
| 5,962,999 | A | 10/1999 | Nakamura et al. |
| 5,987,368 | A | 11/1999 | Kamimae et al. |
| 5,999,868 | A | 12/1999 | Beno et al. |
| 6,025,665 | A | 2/2000 | Poag |
| 6,049,746 | A | 4/2000 | Southward et al. |
| 6,092,618 | A | 7/2000 | Collier-Hallman |
| 6,111,375 | A | 8/2000 | Zenobi |
| 6,161,844 | A | 12/2000 | Charaudeau et al. |
| 6,190,319 | B1 | 2/2001 | Goldowsky |
| 6,227,817 | B1 | 5/2001 | Paden |
| 6,282,453 | B1 * | 8/2001 | Lombardi ............... 700/63 |
| 6,290,034 | B1 | 9/2001 | Ichimaru |
| 6,314,353 | B1 | 11/2001 | Ohsaku et al. |
| 6,349,543 | B1 | 2/2002 | Lisniansky |
| 6,394,238 | B1 | 5/2002 | Rogala |
| 6,397,134 | B1 | 5/2002 | Shal et al. |
| 6,441,508 | B1 | 8/2002 | Hylton |
| 6,452,535 | B1 | 9/2002 | Rao et al. |
| 6,467,748 | B1 * | 10/2002 | Schick ............ B60G 17/0165 248/550 |
| 6,502,837 | B1 | 1/2003 | Hamilton et al. |
| 6,519,517 | B1 | 2/2003 | Heyring et al. |
| 6,519,939 | B1 | 2/2003 | Duff |

(56) References Cited

U.S. PATENT DOCUMENTS

| | | | |
|---|---|---|---|
| 6,559,553 B2 | 5/2003 | Yumita | |
| 6,575,484 B2 | 6/2003 | Rogala et al. | |
| 6,592,060 B1 | 7/2003 | Vomhof et al. | |
| 6,631,960 B2 | 10/2003 | Grand et al. | |
| 6,650,985 B2* | 11/2003 | Lin | B60G 3/14 172/4.5 |
| 6,765,389 B1 | 7/2004 | Moore | |
| 6,876,100 B2 | 4/2005 | Yumita | |
| 6,908,162 B2 | 6/2005 | Obayashi et al. | |
| 6,920,951 B2 | 7/2005 | Song et al. | |
| 6,944,544 B1 | 9/2005 | Prakah-Asante et al. | |
| 6,952,060 B2 | 10/2005 | Goldner | |
| 6,964,325 B2 | 11/2005 | Maes | |
| 6,973,880 B2 | 12/2005 | Kumar | |
| 7,015,594 B2 | 3/2006 | Asada | |
| 7,023,107 B2 | 4/2006 | Okuda et al. | |
| 7,034,482 B2 | 4/2006 | Komiyama et al. | |
| 7,051,526 B2 | 5/2006 | Geiger | |
| 7,087,342 B2 | 8/2006 | Song | |
| 7,156,406 B2 | 1/2007 | Kraus et al. | |
| 7,195,250 B2 | 3/2007 | Knox et al. | |
| 7,198,125 B2* | 4/2007 | Skelcher | B62D 33/0608 180/89.13 |
| 7,206,678 B2 | 4/2007 | Arduc et al. | |
| 7,335,999 B2 | 2/2008 | Potter | |
| 7,336,002 B2 | 2/2008 | Kato et al. | |
| 7,392,998 B2 | 7/2008 | Runkel | |
| 7,427,072 B2 | 9/2008 | Brown | |
| 7,513,490 B2 | 4/2009 | Robertson | |
| 7,533,890 B2 | 5/2009 | Chiao | |
| 7,656,055 B2 | 2/2010 | Torres et al. | |
| 7,722,056 B2 | 5/2010 | Inoue et al. | |
| 7,854,203 B2 | 12/2010 | Kumar | |
| 7,936,113 B2 | 5/2011 | Namuduri et al. | |
| 7,938,217 B2 | 5/2011 | Stansbury | |
| 7,963,529 B2 | 6/2011 | Oteman et al. | |
| 8,063,498 B2 | 11/2011 | Namuduri et al. | |
| 8,067,863 B2 | 11/2011 | Giovanardi | |
| 8,079,436 B2 | 12/2011 | Tikkanen et al. | |
| 8,080,888 B1 | 12/2011 | Daley | |
| 8,143,766 B2 | 3/2012 | Namuduri et al. | |
| 8,167,319 B2 | 5/2012 | Ogawa | |
| 8,253,281 B2 | 8/2012 | Namuduri et al. | |
| 8,255,117 B2 | 8/2012 | Bujak et al. | |
| 8,269,359 B2 | 9/2012 | Boisvert et al. | |
| 8,269,360 B2 | 9/2012 | Boisvert et al. | |
| 8,376,100 B2 | 2/2013 | Avadhany et al. | |
| 8,380,416 B2 | 2/2013 | Offerle et al. | |
| 8,392,030 B2 | 3/2013 | Anderson et al. | |
| 8,453,809 B2 | 6/2013 | Hall | |
| 8,475,137 B2 | 7/2013 | Kobayashi et al. | |
| 8,548,678 B2 | 10/2013 | Ummethala et al. | |
| 8,590,679 B2 | 11/2013 | Hall | |
| 8,596,055 B2* | 12/2013 | Kadlicko | 60/414 |
| 8,672,337 B2* | 3/2014 | van der Knaap et al. | 280/124.106 |
| 8,776,961 B2 | 7/2014 | Mori et al. | |
| 8,820,064 B2 | 9/2014 | Six et al. | |
| 8,839,920 B2 | 9/2014 | Bavetta et al. | |
| 8,840,118 B1 | 9/2014 | Giovanardi et al. | |
| 8,841,786 B2 | 9/2014 | Tucker et al. | |
| 8,892,304 B2 | 11/2014 | Lu et al. | |
| 8,966,889 B2 | 3/2015 | Six | |
| 9,035,477 B2 | 5/2015 | Tucker et al. | |
| 9,067,501 B2* | 6/2015 | Anders | B60L 11/16 |
| 9,108,484 B2 | 8/2015 | Reybrouck | |
| 9,174,508 B2 | 11/2015 | Anderson et al. | |
| 9,205,718 B2 | 12/2015 | Lee | |
| 9,260,011 B2 | 2/2016 | Anderson et al. | |
| 9,550,404 B2 | 1/2017 | Giovanardi et al. | |
| 2001/0033047 A1 | 10/2001 | Beck et al. | |
| 2002/0047273 A1 | 4/2002 | Burns et al. | |
| 2002/0060551 A1 | 5/2002 | Ikeda | |
| 2002/0070510 A1 | 6/2002 | Rogala | |
| 2002/0074175 A1 | 6/2002 | Bloxham | |
| 2002/0128072 A1 | 9/2002 | Terpay et al. | |
| 2002/0145404 A1 | 10/2002 | Dasgupta et al. | |
| 2002/0183907 A1 | 12/2002 | Stiller | |
| 2003/0000765 A1 | 1/2003 | Spadafora | |
| 2003/0034697 A1 | 2/2003 | Goldner et al. | |
| 2003/0077183 A1* | 4/2003 | Franchet et al. | 417/269 |
| 2003/0150352 A1 | 8/2003 | Kumar | |
| 2003/0169048 A1 | 9/2003 | Kim et al. | |
| 2004/0083629 A1* | 5/2004 | Kondou | E02F 3/325 37/348 |
| 2004/0096334 A1 | 5/2004 | Aldinger et al. | |
| 2004/0119289 A1 | 6/2004 | Zabramny | |
| 2004/0206559 A1 | 10/2004 | Song et al. | |
| 2004/0207350 A1 | 10/2004 | Wilton et al. | |
| 2004/0211631 A1 | 10/2004 | Hsu | |
| 2004/0212273 A1 | 10/2004 | Gould | |
| 2005/0017462 A1 | 1/2005 | Kroppe | |
| 2005/0098399 A1 | 5/2005 | Bremner | |
| 2005/0121268 A1 | 6/2005 | Groves et al. | |
| 2005/0246082 A1* | 11/2005 | Miki | E02F 9/2075 701/50 |
| 2005/0280318 A1 | 12/2005 | Parison et al. | |
| 2006/0090462 A1 | 5/2006 | Yoshino | |
| 2006/0178808 A1 | 8/2006 | Wu et al. | |
| 2006/0239849 A1 | 10/2006 | Heltzapple et al. | |
| 2007/0018626 A1 | 1/2007 | Chi | |
| 2007/0021886 A1 | 1/2007 | Miyajima | |
| 2007/0045067 A1* | 3/2007 | Schedgick | B60G 17/0152 188/266 |
| 2007/0088475 A1 | 4/2007 | Nordgren et al. | |
| 2007/0089919 A1 | 4/2007 | de la Torre et al. | |
| 2007/0089924 A1 | 4/2007 | de la Torre et al. | |
| 2007/0120332 A1 | 5/2007 | Bushko et al. | |
| 2007/0170680 A1* | 7/2007 | Knaap | B60G 17/0152 280/124.106 |
| 2007/0233279 A1 | 10/2007 | Kazerooni et al. | |
| 2008/0004771 A1 | 1/2008 | Masamura | |
| 2008/0012262 A1 | 1/2008 | Carabelli | |
| 2008/0111324 A1 | 5/2008 | Davis | |
| 2008/0190104 A1 | 8/2008 | Bresie | |
| 2008/0234900 A1* | 9/2008 | Bennett | 701/48 |
| 2008/0238004 A1* | 10/2008 | Turco | B60G 17/0152 280/5.503 |
| 2008/0238396 A1 | 10/2008 | Ng et al. | |
| 2008/0257626 A1* | 10/2008 | Carabelli | B60G 13/14 180/165 |
| 2008/0265808 A1 | 10/2008 | Sparey et al. | |
| 2009/0015202 A1 | 1/2009 | Miura et al. | |
| 2009/0192674 A1 | 7/2009 | Simons | |
| 2009/0212649 A1 | 8/2009 | Kingman et al. | |
| 2009/0229902 A1 | 9/2009 | Stansbury | |
| 2009/0230688 A1 | 9/2009 | Torres et al. | |
| 2009/0234537 A1 | 9/2009 | Tomida et al. | |
| 2009/0260935 A1 | 10/2009 | Avadhany et al. | |
| 2010/0013229 A1 | 1/2010 | Da Costa | |
| 2010/0044978 A1 | 2/2010 | Delorenzis et al. | |
| 2010/0072760 A1 | 3/2010 | Anderson et al. | |
| 2010/0115936 A1* | 5/2010 | Williamson | E02F 9/2207 60/327 |
| 2010/0138108 A1* | 6/2010 | Kajino | B60G 17/016 701/38 |
| 2010/0217491 A1 | 8/2010 | Naito et al. | |
| 2010/0244457 A1 | 9/2010 | Bhat et al. | |
| 2010/0262308 A1 | 10/2010 | Anderson et al. | |
| 2010/0308589 A1 | 12/2010 | Rohrer | |
| 2011/0024601 A1 | 2/2011 | Shoemaker et al. | |
| 2011/0057478 A1* | 3/2011 | Van der Knaap | B60G 99/008 296/190.07 |
| 2011/0062904 A1 | 3/2011 | Egami | |
| 2011/0127127 A1 | 6/2011 | Hirao et al. | |
| 2011/0162903 A1 | 7/2011 | Stragier | |
| 2011/0181087 A1 | 7/2011 | Kniffin et al. | |
| 2011/0303049 A1 | 12/2011 | Neelakantan et al. | |
| 2012/0010780 A1 | 1/2012 | Hayashi et al. | |
| 2012/0055745 A1 | 3/2012 | Buettner et al. | |
| 2012/0063922 A1 | 3/2012 | Sano et al. | |
| 2012/0067037 A1* | 3/2012 | Bohrer | A01D 75/187 60/450 |

(56) References Cited

U.S. PATENT DOCUMENTS

| | | |
|---|---|---|
| 2012/0078470 A1 | 3/2012 | Hirao et al. |
| 2012/0181757 A1 | 7/2012 | Oteman et al. |
| 2012/0230850 A1 | 9/2012 | Kawano et al. |
| 2012/0233991 A1* | 9/2012 | Ivantysynova ............... 60/327 |
| 2012/0305347 A1 | 12/2012 | Mori et al. |
| 2013/0081382 A1* | 4/2013 | Nelson .............. F15B 11/024 60/327 |
| 2013/0147205 A1 | 6/2013 | Tucker et al. |
| 2013/0154280 A1 | 6/2013 | Wendell et al. |
| 2013/0221625 A1 | 8/2013 | Pare et al. |
| 2013/0264158 A1 | 10/2013 | Hall |
| 2014/0095022 A1 | 4/2014 | Cashman et al. |
| 2014/0195114 A1 | 7/2014 | Tseng et al. |
| 2014/0225408 A1 | 8/2014 | Scully |
| 2014/0260233 A1 | 9/2014 | Giovanardi et al. |
| 2014/0265169 A1 | 9/2014 | Giovanardi et al. |
| 2014/0265170 A1 | 9/2014 | Giovanardi et al. |
| 2014/0271066 A1* | 9/2014 | Hou ........................... 414/408 |
| 2014/0288776 A1 | 9/2014 | Anderson et al. |
| 2014/0294601 A1 | 10/2014 | O'Shea et al. |
| 2014/0294625 A1 | 10/2014 | Tucker et al. |
| 2014/0297116 A1 | 10/2014 | Anderson et al. |
| 2014/0297117 A1 | 10/2014 | Near et al. |
| 2014/0297119 A1 | 10/2014 | Giovanardi et al. |
| 2014/0346783 A1 | 11/2014 | Anderson et al. |
| 2014/0358378 A1 | 12/2014 | Howard et al. |
| 2015/0059325 A1* | 3/2015 | Knussman ............ E02F 9/2217 60/327 |
| 2015/0114739 A1 | 4/2015 | Newman |
| 2015/0192114 A1 | 7/2015 | Triebel et al. |
| 2015/0224845 A1 | 8/2015 | Anderson et al. |
| 2015/0316039 A1 | 11/2015 | Tucker et al. |
| 2016/0031285 A1 | 2/2016 | Tucker et al. |
| 2016/0059664 A1 | 3/2016 | Tucker et al. |
| 2016/0075205 A1 | 3/2016 | Anderson et al. |
| 2016/0097406 A1 | 4/2016 | Zuckerman et al. |
| 2016/0114643 A1 | 4/2016 | Anderson et al. |

FOREIGN PATENT DOCUMENTS

| | | | | |
|---|---|---|---|---|
| CN | 2707546 Y | 7/2005 | | |
| CN | 101104381 A | 1/2008 | | |
| CN | 201002520 Y | 1/2008 | | |
| CN | 101749353 A | 6/2010 | | |
| DE | 3937987 A1 | 5/1991 | | |
| DE | 195 35 752 A1 | 3/1997 | | |
| EP | 0 363 158 A2 | 4/1990 | | |
| EP | 1878598 | 1/2008 | | |
| EP | 2 541 070 A1 | 1/2013 | | |
| FR | 2152111 A | 4/1973 | | |
| FR | 2346176 A | 10/1977 | | |
| FR | 2661643 A1 | 11/1991 | | |
| GB | 652732 | 5/1951 | | |
| GB | 1070783 | 6/1967 | | |
| JP | S22-3510 U | 12/1947 | | |
| JP | S59-187124 A | 10/1984 | | |
| JP | H3-123981 U1 | 12/1991 | | |
| JP | H05-50195 U | 7/1993 | | |
| JP | 8-226377 A2 | 9/1996 | | |
| JP | H11-166474 A | 6/1999 | | |
| JP | 2001-311452 A | 9/2001 | | |
| JP | 2003/035254 | 2/2003 | | |
| JP | 2005-521820 | 7/2005 | | |
| JP | 2008-536470 A | 9/2008 | | |
| JP | 2009-115301 A | 5/2009 | | |
| JP | EP 2131072 A1 * | 12/2009 | ............ | E02F 9/2253 |
| JP | EP 2136055 A1 * | 12/2009 | ............ | B60W 10/30 |
| WO | WO 97/26145 A | 7/1997 | | |
| WO | WO 2007/071362 A1 | 6/2007 | | |
| WO | WO 2011/159874 A2 | 12/2011 | | |
| WO | WO 2012/167316 A1 | 12/2012 | | |

OTHER PUBLICATIONS

Shen et al., Automative electric power and energy mangement—a system approach. Business Briefing: Global Automotive Manufacturing and Technology. 2003:1-5.

Kaminaga et al., Mechanism and Control of knee power augmenting device with backdrivable electro-hydrostatic actuator. 13th World congress Mechanism Machine Science. Jun. 19-25, 2011. 1-10.

[No Author Listed] Ride control innovation, accelerated[SM]. Forward thinking. Forward moving. ACOCAR. Tenneco. Sep. 2011.

McGehee et al., Hydraulic accumulators tame shock and vibration. News content from Machine Design. Mar. 2, 2011. 9 pages.

Vandersmissen, ACOCAR active suspension. Vehicle Dynamics Expo. Stuttgart, Jul. 5, 2008. 24 pages.

Vandersmissen et al., The new Tenneco ACOCAR active suspension. Vehicle Dynamics Expo. Stuttgart, Jun. 22-24, 2010. 19 pages.

* cited by examiner

ACTIVE STABILIZATION SYSTEM FOR TRUCK CABINS

CROSS-REFERENCE TO RELATED APPLICATIONS

This application is a continuation of International Application PCT/US2014/029654, entitled "ACTIVE VEHICLE SUSPENSION IMPROVEMENTS", filed Mar. 14, 2014, which claims the benefit under 35 U.S.C. §119(e) of U.S. provisional application Ser. No. 61/913,644, entitled "WIDE BAND HYDRAULIC RIPPLE NOISE BUFFER", filed Dec. 9, 2013, U.S. provisional application Ser. No. 61/865,970, entitled "MULTI-PATH FLUID DIVERTER VALVE", filed Aug. 14, 2013, U.S. provisional application Ser. No. 61/815,251, entitled "ACTIVE SUSPENSION", filed Apr. 23, 2013, and U.S. provisional application Ser. No. 61/789,600, entitled "ACTIVE SUSPENSION", filed Mar. 15, 2013, the disclosures of which are incorporated by reference in their entirety. This application also claims the benefit under 35 U.S.C. §119(e) of U.S. provisional application Ser. No. 61/930,452, entitled "ELECTROHYDRAULIC SYSTEMS", filed Jan. 22, 2014, the disclosure of which is incorporated by reference in its entirety.

FIELD

Disclosed embodiments are related to an active stabilization system for truck cabins.

BACKGROUND

Existing commercial trucking vehicles consist of a vehicle operator cabin that is suspended from the vehicle chassis in an attempt to passively or semi-actively mitigate the harsh mechanical road inputs that the chassis experiences. Some modern systems use passive dampers to reduce the amount of heave, pitch, and roll felt by the vehicle operator. Semi-active systems use sensors and control protocols that further reduce the effects of these inputs. Active cabin stabilization systems exist that use vibration isolators to mitigate small cabin motions and vibration. The active stabilization system detailed in this patent uses sensors such as accelerometers and gyroscopes to measure forces that result from the vehicle's interaction with its environment, such as mechanical road inputs, and transmits the inputs to a controller which interprets the inputs and commands the appropriate force responses to actuators located between the operator cabin and chassis of the vehicle. The system uses a feed-forward approach to predict movements that the cabin will experience and command the actuators to respond appropriately to isolate the movement. The system greatly reduces pitch, roll, and heave motions, which may lead to operator discomfort.

SUMMARY

Aspects of the invention relate to a commercial vehicle cabin stabilization system that actively responds to external force inputs from the road using sensors to monitor mechanical road input, and at least one or a plurality of controllers to command force outputs to at least one or a plurality of electro-hydraulic actuators to isolate the cabin from these inputs.

According to one aspect, the system is comprised of a plurality of electro-hydraulic actuators, each actuator comprising an electric motor operatively coupled to a hydraulic pump, and a closed hydraulic circuit, wherein each of the plurality of electro-hydraulic actuators is disposed between structural members of the chassis and cabin of the vehicle.

According to another aspect, the system has at least one sensor to sense movement in at least one axis of at least one of the cabin and the chassis.

According to another aspect, the system has a control program executing on at least one controller to activate at least one of the plurality of electro-hydraulic actuators in response to the sensed movement, wherein the activated at least one of the plurality of electro-hydraulic actuators operates to isolate at least a portion of the chassis movement from the cabin.

In some embodiments, the control program causes current to flow through the electric motor to at least one of induce rotation of the hydraulic motor thereby inducing hydraulic fluid flow through the actuator and retard rotation of the hydraulic motor thereby reducing movement of the actuator.

In some embodiments, the electro-hydraulic actuator hydraulic pump has a first port and a second port, wherein the first port is in fluid communication with the first side of a hydraulic cylinder, and the second port is in fluid communication with the second side of the hydraulic cylinder, and each actuator further comprises of an accumulator.

In some embodiments, each actuator further comprises a dedicated controller and each dedicated controller executes a version of the control program.

In some embodiments, at least one electro-hydraulic actuator operates to control roll, pitch, and heave of the cabin.

In some embodiments, at least one electro-hydraulic actuator is disposed perpendicular to the vehicle chassis and cabin.

In some embodiments, at least one electro-hydraulic actuator is disposed at a non-perpendicular angle between the chassis and cabin.

In some embodiments, the system can control fore and aft motion of the cabin.

In some embodiments, the plurality of sensors are adapted to detect vehicle acceleration in at least two axes.

In some embodiments, the plurality of sensors are feed-forward sensors and adapted to detect at least one of steering angle, brake application, and throttle.

In some embodiments, the plurality of sensors includes a sensor to detect movement of the operator's seat.

In some embodiments, the cabin is a front hinged cabin and the plurality of electro-hydraulic actuators comprises of two actuators operatively connected to the rear of the cabin.

In some embodiments, the cabin is four-point suspended cabin and the plurality of electro-hydraulic actuators comprises of four actuators operatively connected to each corner of the cabin.

In some embodiments, the system further is comprised of the least of one and a plurality of actuators disposed between a operator's seat and the cabin, wherein the least of one and a plurality of controllers for the least of one and a plurality of seat actuators communicate with the cabin suspension actuators.

In some embodiments, energy in the actuator is consumed in response to a command force.

According to one aspect, the system is a vehicle cabin stabilization system comprising a plurality of electro-hydraulic actuators, each actuator comprising an electric motor operatively coupled to a hydraulic pump, and a closed hydraulic circuit, wherein each of the plurality of electro-hydraulic actuators is disposed between structural members of the chassis and cabin of the vehicle;

According to another aspect, there is at least one sensor for determining movement of the vehicle in at least two axes.

According to another aspect, there is a control program executing on the controller to activate the plurality of electro-hydraulic actuators in response to the sensed vehicle movement, wherein the activated plurality of electro-hydraulic actuators cooperatively operate to isolate at least a portion of pitch, roll, and heave motions of the cabin from the determined vehicle movement.

In some embodiments, the plurality of sensors disposed to sense movement of the vehicle sense at least one of the chassis, the wheels, a seat, and the cabin.

In some embodiments, the control program causes current to flow through the electric motor to at least one of induce rotation of the hydraulic motor thereby inducing hydraulic fluid flow through the actuator and retard rotation of the hydraulic motor thereby reducing movement of the actuator.

In some embodiments, the electro-hydraulic actuator hydraulic pump has a first port and a second port, wherein the first port is in fluid communication with the first side of a hydraulic cylinder, and the second port is in fluid communication with the second side of the hydraulic cylinder, and each actuator further comprises of an accumulator.

In some embodiments, each actuator further comprises a dedicated controller and each dedicated controller executes a version of the control program.

In some embodiments, at least one electro-hydraulic actuator is disposed perpendicular to the vehicle chassis and cabin.

In some embodiments, at least one electro-hydraulic actuator is disposed at a non-perpendicular angle between the chassis and cabin.

In some embodiments, the system can control fore and aft motion of the cabin.

In some embodiments, the plurality of sensors are feedforward sensors and adapted to detect at least one of steering angle, brake application, and throttle.

In some embodiments, the plurality of sensors includes a sensor to detect movement of the operator's seat.

In some embodiments, the cabin is a front hinged cabin and the plurality of electro-hydraulic actuators comprises of two actuators operatively connected to the rear of the cabin.

In some embodiments, the cabin is four-point suspended cabin and the plurality of electro-hydraulic actuators comprises of four actuators operatively connected to each corner of the cabin.

In some embodiments, the system is further comprised of the least of one and a plurality of actuators disposed between a operator's seat and the cabin, wherein the least of one and a plurality of controllers for the least of one and a plurality of seat actuators communicate with the cabin suspension actuators.

In some embodiments, energy in the actuator is consumed in response to a command force.

According to one aspect, the system is a method of secondary vehicle suspension wherein a plurality of controllable electro-hydraulic actuators are disposed between a structural member of a vehicle chassis and a structural member of a cabin of the vehicle.

According to another aspect, sensed movement information is received on at least one of the plurality of self-controllable electro-hydraulic actuators.

According to another aspect, the plurality of controllable electro-hydraulic actuators are controlled to mitigate the impact of the sensed vehicle movement on the cabin by applying current to at least one electric motor that controls movement of the hydraulic fluid through one of the plurality of actuators by at least one of resisting and assisting rotation of a hydraulic pump that engages the hydraulic fluid.

In some embodiments, the electric motor is immersed in hydraulic fluid with the pump.

In some embodiments, movement of the vehicle is measured the cabin, the chassis, the wheels, or some combination of the three.

According to one aspect, the system is a method of secondary vehicle suspension wherein a plurality of self-controllable electro-hydraulic actuators are disposed between a structural member of a vehicle chassis and a structural member of a cabin of the vehicle.

According to another aspect, sensed movement information is received on at least one of the plurality of self-controllable electro-hydraulic actuators.

According to another aspect, the movement of the cabin is mitigated by controlling rotation of a hydraulic motor of the self-controllable electro-hydraulic actuator that at least partially determines hydraulic fluid pressure within the self-controllable electro-hydraulic actuator in response to the sensed movement.

In some embodiments, each of the plurality of self-controllable electro-hydraulic actuators responds independently to the sensed movement.

In some embodiments, each of the plurality of self-controllable electro-hydraulic actuators comprises at least one local sensor to sense movement of the vehicle.

In some embodiments, each of the plurality of self-controllable electro-hydraulic actuators responds cooperatively to the sensed movement by communicating with at least one other of the plurality of self-controllable electro-hydraulic actuators.

According to one aspect, the system is a method of secondary vehicle suspension, which senses movement of a vehicle chassis.

According to another aspect, a reactive movement of a cabin of the vehicle based on the sensed movement is predicted.

According to another aspect, a plurality of controllable electro-hydraulic actuators disposed between a structural member of the vehicle chassis and a structural member of the cabin are controlled to counteract a portion of the predicted reactive movement that impacts at least one of roll, pitch and heave of the cabin.

In some embodiments, controlling comprises applying current to at least one electric motor that controls movement of the hydraulic fluid through one of the plurality of actuators by at least one of resisting or assisting rotation of a hydraulic pump that engages the hydraulic fluid.

According to one aspect, the system is a method of secondary vehicle suspension wherein movement of a vehicle cabin is sensed using an accelerometer, a gyroscope, a position sensor, or some combination of the three.

According to another aspect, a plurality of controllable electro-hydraulic actuators disposed between a structural member of the vehicle chassis and a structural member of the cabin are controlled to counteract a portion of the cabin movement in the roll, pitch and heave modes of the cabin.

In some embodiments, controlling comprises applying current to at least one electric motor that controls movement of the hydraulic fluid through one of the plurality of actuators by at least one of resisting or assisting rotation of a hydraulic pump that engages the hydraulic fluid.

BRIEF DESCRIPTION OF DRAWINGS

The accompanying drawings are not intended to be drawn to scale. In the drawings, each identical or nearly identical component that is illustrated in various figures may be represented by a like numerical. For purposes of clarity, not every component may be labeled in every drawing.

DETAILED DESCRIPTION

The secondary vehicle stabilization system detailed herein uses a feed forward approach to receiving road inputs and triggering actuator response prior to the mechanical road input reaching the operator cabin. The system is able to accurately predict the motion of the operator cabin with ample time to apply force responses to the actuators. The system detailed herein provides for optimal stabilization of an operator cabin on a truck. The electro-hydraulic actuators included in the system are detailed below.

Figure 1:
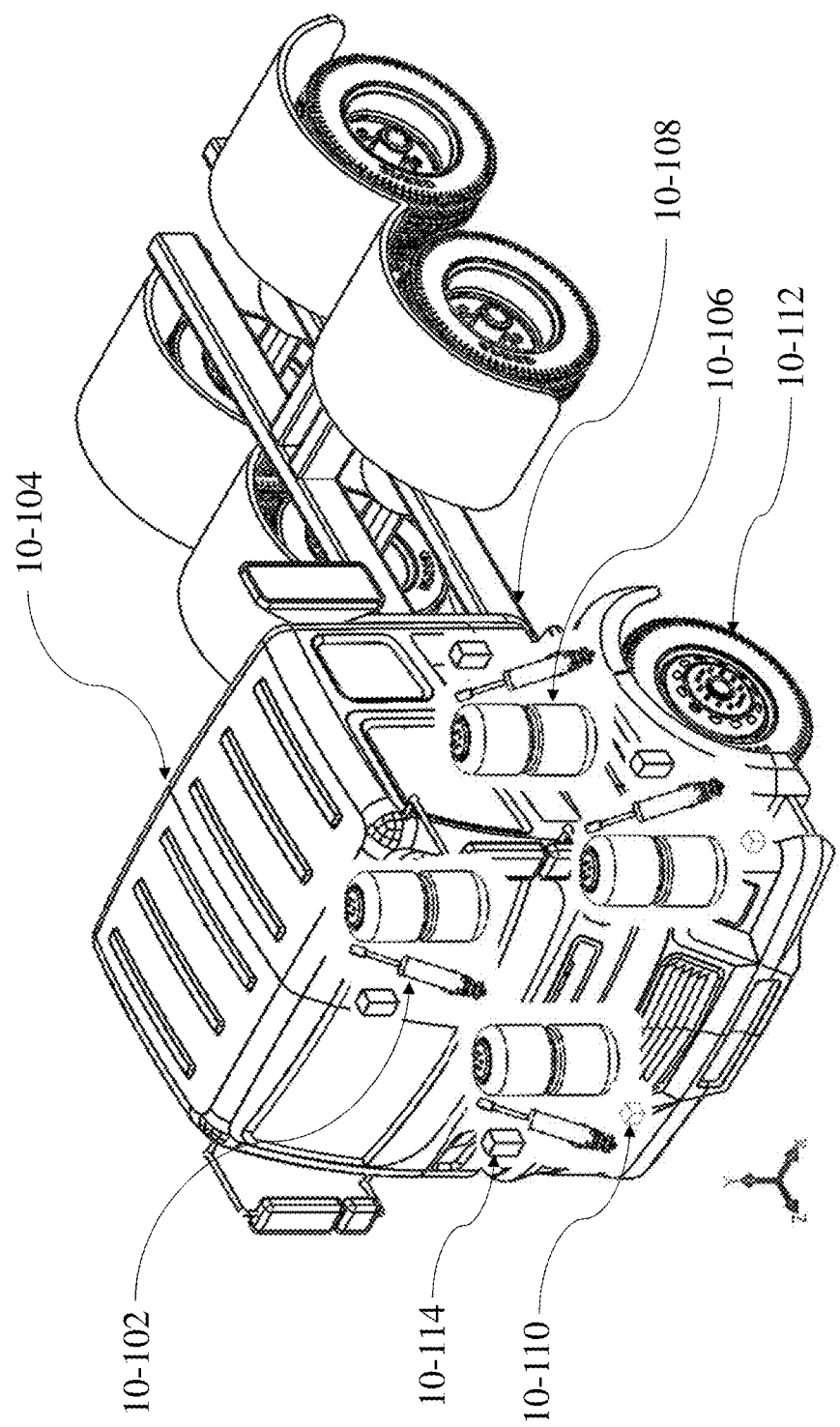
FIG. 1 is a schematic representation of a four point active truck cabin stabilization system. Shown in the breakout view are four electro-hydraulic actuators, four springs (represented here as air springs but can be any type of self-contained device acting as a spring), a plurality of sensors, a plurality of controllers, and the main structures that make up the vehicle.

Referring to FIG. 1, as a truck drives over a road event such as a pothole or unevenness in the road, a mechanical force input is introduced into the chassis of the vehicle 10-108 through the wheel 10-112. By placing sensors (accelerometers, position sensors, gyroscopes, etc.) 10-110 on the vehicle chassis 10-108 or on the suspension to measure wheel motion, the mechanical input is registered by a controller(s) 10-114. By sensing these external force inputs on the vehicle chassis or suspension, the sensors provide information to the controller pertaining to the forces that may generate cabin disturbances, before they can affect the cabin and far enough in advance of the input being transmitted to the cabin 10-104 that the system is able to predict the pitch, roll, and heave motions that will be transmitted to the operator cabin. This allows ample time for one or more controllers 10-114 to deliver commands for force outputs to one or more electro-hydraulic actuators 10-102. The system is therefore able to eliminate the pitch, roll, and heave motions felt by the vehicle operator, making the active stabilization system a feed-forward system.

The electro-hydraulic actuator 10-102 comprises an electric motor operatively coupled to a hydraulic pump and a closed hydraulic circuit that is able to create controlled forces in multiple (e.g., typically three or four) quadrants of a damper/actuator force-velocity curve, whereby the four quadrants of the force-velocity profile of the hydraulic actuator correspond to compression damping, extension damping, active extension, and active compression. When an active force output is commanded to an actuator, energy is consumed by the actuator; conversely, when the actuator is operating in the damping regime, the actuator is regenerative, and energy is generated by the actuator that can be stored or used by the system.

In the embodiment shown in FIG. 1 the electro-hydraulic actuators 10-102 are coupled between the chassis 10-108 and the cabin 10-104. Springs 10-106 are also coupled between the chassis and the cabin and operate mechanically in parallel with the actuators 10-102. The electro-hydraulic actuators 10-102 and the springs 10-106 may be the only structural members between the chassis 10-108 and the cabin 10-104, or there may be additional supporting structures that do not inhibit the actuation of the actuators 10-102 or the springs 10-106.

The actuators 10-102 may be disposed such that they are oriented perpendicular to the chassis 10-108 and the cabin 10-104, for example along the y axis as it is shown in FIG. 1. When installed in this orientation, the actuators 10-102 may impart force outputs on the chassis 10-108 and the cabin 10-104 in the direction of the y axis. In some embodiments, this orientation may be sufficient to mitigate the effects of external force inputs on the cabin such as pitch, roll, and heave. In other embodiments where this may not be sufficient the actuators 10-102 may be disposed such that they are oriented at a non-perpendicular angle between the chassis 10-108 and the cabin 10-104. In this orientation, the actuators 10-102 may impart a force output with some component in any of the x, y, or z directions, which may further assist in controlling fore and aft motions of the cabin.

The electro-hydraulic actuator 10-102 may comprise of an integral (or dedicated) motor controller 10-114, wherein the electronic controller 10-114 may comprise of both power and logic capabilities and may also include sensors, such as a rotary position sensor, accelerometer, gyroscopes, or temperature sensors etc. The controller may comprise a control program (or protocol) whereby the controller executes a program in response to the sensed vehicle movement or other input that causes current to flow through the electric motor to either induce rotation of the hydraulic motor thereby inducing hydraulic fluid flow through the actuator or to retard rotation of the hydraulic motor thereby reducing movement of the actuator to isolate at least a portion of pitch, roll, and heave motions of the cabin from the determined vehicle movement.

The electronic controller 10-114 may utilize signals from the integral sensors and/or utilize signals from external sensors such as suspension position sensors, chassis accelerometers, wheel accelerometers, vehicle speed sensors and the like to isolate at least a portion of pitch, roll, and heave motions of the cabin from the determined vehicle movement. The electronic controller may also have the capability to communicate with other vehicle systems (via the controller area network (CAN) bus, FLEXRAY or other communication protocols). These systems may include the other electro-hydraulic actuator controllers installed on the vehicle, an electro-hydraulic actuator central controller etc., as well as non-suspension related vehicle systems such as steering, brake and throttle systems etc. The system may use at least one of the accelerometers, position sensors or gyroscopes for monitoring chassis disturbances from wheel events or inertial effects on the cabin in any combination of axes, whereby any of these sensors may be able to detect vehicle acceleration in at least two axes. Other sensors may assist in predicting the movement of the vehicle or portions of the vehicle, which can aid in the mitigation of the sensed movements on the cabin 10-104. These sensors can be mounted in various locations, wherein sensors mounted on the wheels or suspension members that are coupled to the wheels may be the first to experience external force inputs from the road. Sensors mounted on the chassis 10-108 or the cabin 10-104 can monitor the inputs felt by their respective structures. Sensors mounted on the operator's seat may provide an accurate mapping of the inputs felt by the operator. Sensors mounted on the controlling instrumentation of the vehicle such as the steering system, the braking system, or the throttle system can provide input which might allow the system to predict disturbances that may affect the cabin. Sensors mounted near the actuators 10-102 can provide realistic data pertaining to the appropriate force output that should be commanded to the respective actuator 10-102. The term "sensor" should be understood, except where context indicates otherwise, to encompass all such analog and digital sensors, as well as other data collection devices and systems, such as forward-looking cameras, navigation and GPS systems that provide advance information about road conditions, and the like that may provide input to the controllers described herein.

The system may comprise of a plurality of self-controllable electro-hydraulic actuators 10-102, wherein a self-controllable actuator 10-102 may comprise an integral sensor 10-110, a controller 10-114, accumulator, hydraulic pump, and electric motor, and may further comprise local power storage. The controller 10-114 may comprise an independent control algorithm to control the actuator 10-102 based solely on input gathered by the integrated sensor, thereby each actuator 10-102 may operate independently of the other actuators 10-102 in the system. In some embodiments, the self-controllable actuators 10-102 may operate in unison to improve the ability of the system to mitigate cabin 10-104 movement.

In the embodiment of FIG. 1 a four point active stabilization system is disclosed. The system comprises four electro-hydraulic actuators 10-102, four springs 10-106 (in the embodiment disclosed the springs are represented as air springs, but these may be mechanical springs such as coil springs, torsion springs leaf springs etc. as the disclosure is not limited in this regard), at least one controller(s) 10-114, and at least one sensor(s) 10-110 (accelerometers, etc.), wherein the four electro-hydraulic actuators may be located proximal to the four corners of the cabin 10-104, wherein the four springs operate mechanically in parallel with the actuators.

An actuator(s) 10-102 may be mounted between the operator's seat (not shown) and the vehicle cabin 10-104. These actuators 10-102 can be self-controllable or they can communicate with the actuators disposed between the cabin 10-104 and the chassis 10-108. In the latter case, the actuators 10-102 located at the operator's seat can be substantially more predictive of the movements that will be experienced by the operator and can respond appropriately. The seat actuators 10-102 may be coupled to a spring 10-106 in a similar fashion to the cabin actuators 10-102.

Figure 2:
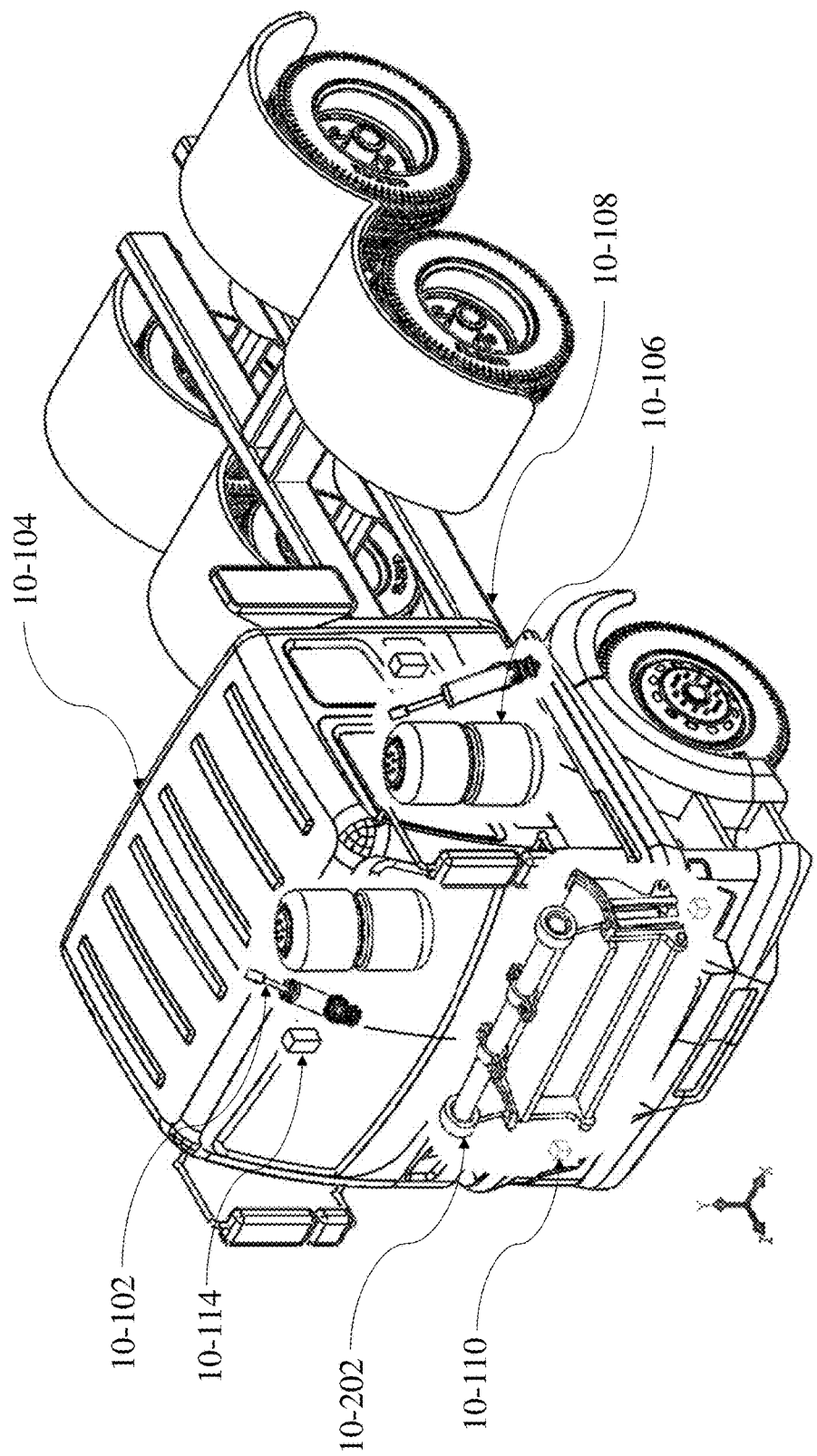
FIG. 2 is a schematic representation of a three point active truck cabin stabilization system. Shown in the breakout view are two electro-hydraulic actuators, two springs (represented here as air springs but can be any type of self-contained device acting as a spring), a plurality of sensors, a plurality of controllers, a hinge mechanism, and the main structures that make up the vehicle.

FIG. 2 depicts an embodiment of a truck with three point assembly active stabilization system, wherein the system comprises of two electro-hydraulic actuators 10-102 coupled between the chassis and the cabin, two springs 10-106 operating mechanically in parallel with the actuators (in the embodiment disclosed these are represented as air springs but may be any form of spring), at least one and at most three controllers 10-114, and at least one and at most four sensors 10-110 (e.g. accelerometers, position sensors, gyroscopes etc.), wherein the two rear corners of the vehicle operator cabin 10-104 are coupled to the vehicle chassis 10-108 via actuators 10-102 and springs 10-106, wherein the front of the vehicle operator cabin 10-104 is pivotally connected to the vehicle chassis 10-108 via a hinge mechanism 10-202, whereby the cabin 10-104 has the ability to translate and rotate in at least one of the x, y, and z axes.

Actuators 10-102 may be mounted between the operator's seat (not shown) and the vehicle cabin 10-104. These actuators 10-102 can be self-controllable or they can communicate with the actuators disposed between the cabin 10-104 and the chassis 10-108. In the latter case, the actuators 10-102 located at the operator's seat can be substantially more predictive of the movements that will be experienced by the operator and can respond appropriately. The seat actuators 10-102 may be coupled to a spring 10-106 in a similar fashion to the cabin actuators 10-102.

Figure 3:
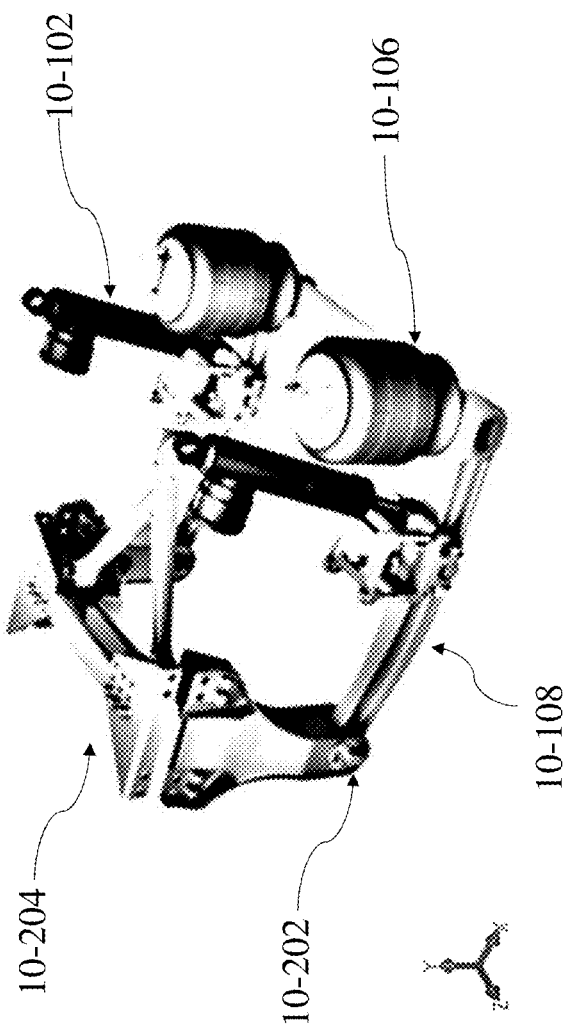
FIG. 3 is an isometric view of an isolated assembly of a three point active truck cabin stabilization system.

In FIG. 3 is an isometric view of an isolated assembly of a three point active truck cabin stabilization system is disclosed showing the two electro-hydraulic actuators 10-102, the two air springs 10-106, a vehicle chassis member 10-108, the pivoting hinge mechanism 10-202 and an articulating cabin support member 10-204.

Figure 4:
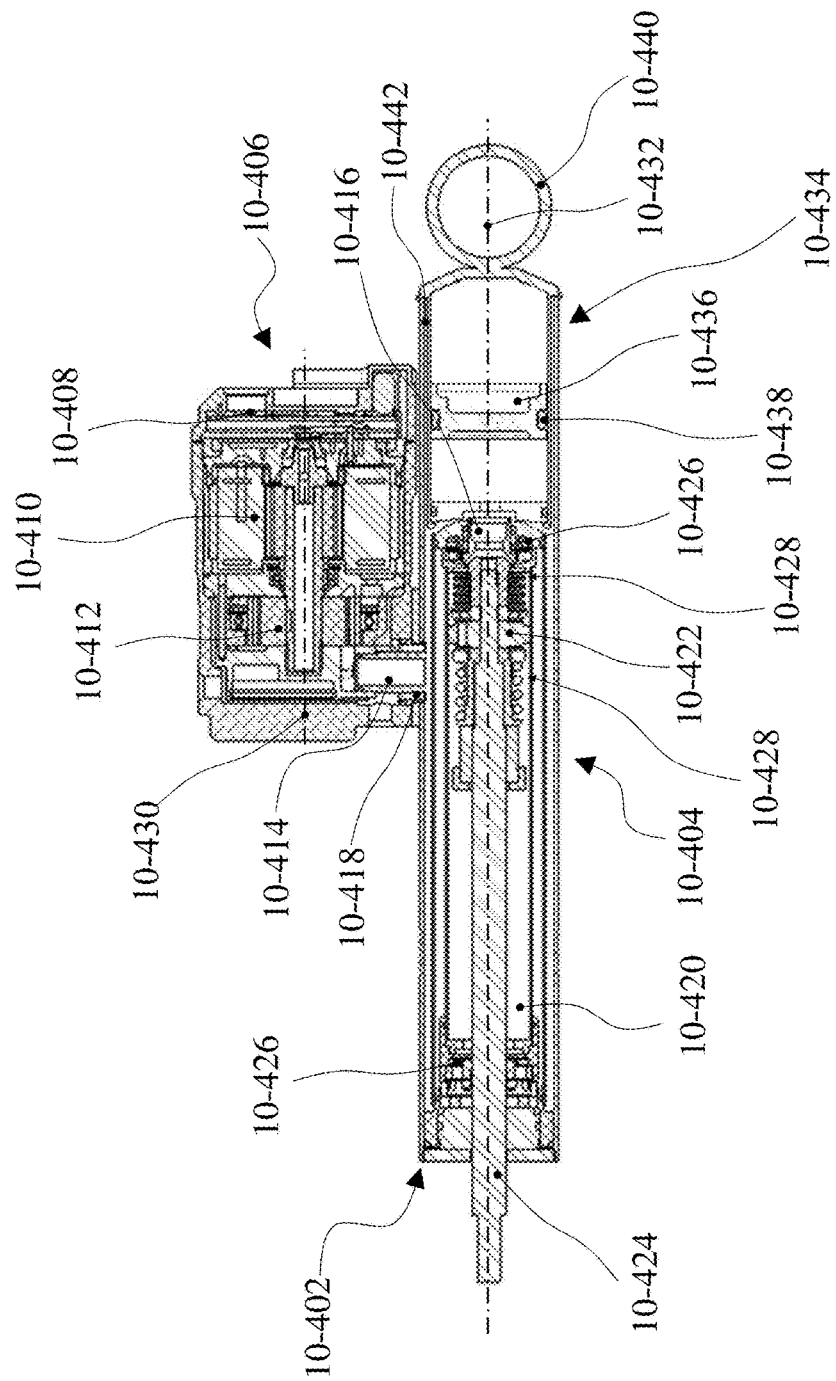
FIG. 4 is an embodiment of an active suspension actuator that comprises a hydraulic regenerative, active/semi-active damper smart valve.

In FIG. 4 an example of an actuator 10-102 utilized in a three point and four point active truck cabin stabilization system is disclosed. The actuator 10-102 is driven by a hydraulic pump that is coupled to an electric motor. The actuator 10-102 has a central axis of actuation 10-432. As a current is applied to the electric motor by the controller 10-114, to either assist or resist in the rotation of a hydraulic pump. This rotation causes the hydraulic pump to channel fluid through the actuator 10-102. Depending on the direction of the applied rotational torque, the channeling of hydraulic fluid causes the piston of the actuator 10-102 to translate in either the compression stroke or the rebound stroke along the central axis of actuation 10-432. The actuator 10-102 is coupled between the vehicle operator cabin 10-104 and the vehicle chassis 10-108 by means of a top mounting mechanism and a bottom mounting mechanism. An example of a top mounting mechanism is provided for mounting to the vehicle operator cabin. An example of a bottom mounting mechanism is provided for mounting to the vehicle chassis. The location of the mounting point on the vehicle operator cabin for affixing the top mounting mechanism and the location of the mounting point on the vehicle chassis for affixing the bottom mounting mechanism may be located such that the central axis of actuation 10-432 has some component in each of the x, y, and z axes. This enables each actuator 10-102 to affect the movement of the vehicle operator cabin in each of the aforementioned axes.

FIG. 4 shows an embodiment of the electro-hydraulic actuator that comprises a hydraulic regenerative, active/semi-active smart valve 10-406 and a hydraulic actuator 10-402. The hydraulic actuator 10-402 comprises an actuator body (housing) 10-404. The smart valve 10-406 is close coupled to the actuator body 10-404 so that there is a tight integration and short fluid communication between the smart valve and the actuator body, and is sealed so that the electro-hydraulic smart valve assembly becomes a single body actuator. In the embodiment shown in FIG. 4 the smart valve 10-406 is coupled to the actuator body 10-404 so that the axis of the smart valve (i.e. the rotational axis of the integrated HSU and electric motor) 10-430 is parallel with the actuator body, although the smart valve may be orientated with its axis 10-430 perpendicular to the actuator axis 10-432 or at some angle in between.

The integrated smart valve 10-406 comprises of an electronic controller 10-408, an electric motor 10-410 that is close coupled to a hydraulic pump/motor (HSU) 10-412. The HSU has a first port 10-414 that is in fluid communication with a first side 10-416 in the actuator body 10-404 and a second port 10-418 that is in fluid communication with a second side 10-420 in the actuator body 10-404. The first port and second port comprises a fluid connection to the actuator wherein, the hydraulic connection comprises a first tube inside a second tube, wherein the first port is via the first tube, and the second port is via the annular area between the first tube and second tube. In an alternate embodiment the hydraulic connection may comprise of two adjacent ports. Hydraulic seals are used to contain the fluid within the first and second hydraulic connections as well as to ensure that fluid is sealed within the actuator. It is well understood to anyone skilled in the art that many other permutations of hydraulic connection arrangements can be constructed and the patent is not limited in this regard.

In the embodiment disclosed in FIG. 4 the first side represents an extension volume and the second side represents a compression volume; however, these chambers and volumes may be transposed and the disclosure is not limited in this regard. The HSU 10-412 is in hydraulic communication with a piston 10-422 and piston rod 10-424 so that when the piston and piston rod moves in a first direction (i.e. an extension stroke) the HSU rotates in a first rotation, and when the piston and piston rod moves in a second direction (i.e. a compression stroke) the hydraulic motor rotates in a second rotation. The close coupling of the HSU first and second ports with the extension and compression chambers of the actuator allows for a very stiff hydraulic system, which is very favorable for the responsiveness of the active suspension actuator.

The active suspension actuator 10-402 may have a high motion ratio from the linear speed of the piston 10-422 and piston rod 10-424 to the rotational speed of the close coupled HSU and electric motor, and during high velocity events extremely high rotational speeds may be achieved by the closely coupled HSU and electric motor, which may cause damage to the HSU and electric motor. To overcome this issue and allow the actuator to survive high speed suspension events, passive valving may be incorporated to act hydraulically in either parallel, in series, or combination of both, with the HSU. Such passive valving may include a diverter valve(s) 10-426. The diverter valve(s) 10-426 is configured to activate at fluid flow rate (i.e. a fluid diversion threshold) and will divert hydraulic fluid away from the HSU 10-412 that is operatively connected to the hydraulic actuator in response to the hydraulic fluid flowing at a rate that exceeds the fluid diversion threshold. The fluid diversion threshold may be selected so that the maximum safe operating speed of the HSU and motor is never exceeded, even at very high speed suspension events. When the diverter activates and enters the diverted flow mode, restricting fluid flow to the hydraulic pump, a controlled split flow path is created so that fluid flow can by-pass the hydraulic pump in a controlled manner, thereby creating a damping force on the actuator so that wheel damping is achieved when the diverter valve is in the diverted flow mode. A diverter valve may be incorporated in at least one of the compression and extension stroke directions. The diverter valve(s) may located in the extension volume and compression volumes as shown in the embodiment of FIG. 4 or elsewhere in the hydraulic connection between the actuator body 10-404 and the HSU 10-406, and the disclosure is not limited in this regard. Other forms of passive valving may be incorporated to act hydraulically in either parallel, in series (or combination of both) with the HSU, such as a blow-off valve(s) 10-428. The blow off valve(s) can be adapted so that can operate when a specific pressure drop across the piston 10-422 is achieved, thereby limiting the maximum pressure in the system. The blow off valve(s) 10-428 may located in the piston as shown in the embodiment of FIG. 4 or elsewhere in the hydraulic connection between the actuator body 10-404 and the HSU 10-406, and the disclosure is not limited in this regard. The passive valving used the active suspension actuator 10-402 can be adapted so as to provide a progressive actuation, thereby minimizing any NVH (noise, vibration, or harshness) induced by their operation. The passive valving that may be incorporated the in the active suspension actuator may comprise of at least one of progressive valving, multi-stage valving, flexible discs, disc stacks, amplitude dependent damping valves, volume variable chamber valving, baffle plate for defining a quieting duct for reducing noise related to fluid flow. Other forms of controlled valving may also be incorporated the in the active suspension actuator, such as proportional solenoid valving placed in series or in parallel with the HSU, electromagnetically adjustable valves for communicating hydraulic fluid between a piston-local chamber and a compensating chamber, and pressure control with adjustable limit valving. These types of arrangements and constructions of passive and controlled valving are well known in the art, and anyone skilled in the art could construct and adapt such arrangements, and as such the patent is not limited in this regard.

Since fluid volume in the actuator body 10-404 changes as the piston 10-424 enters and exits the actuator, the embodiment of FIG. 4 includes an accumulator 10-434 to accept the piston rod volume. In one embodiment disclosed, the accumulator is a nitrogen-filled chamber with a floating piston 10-436 able to move in the actuator body and sealed from the hydraulic fluid with a seal 10-438. In the embodiment shown the accumulator is in fluid communication with the compression chamber 10-416. The nitrogen in the accumulator is at a pre-charge pressure, the value of which is determined so that it is at a higher value than the maximum working pressure in the compression chamber. The floating piston 10-436 rides in the bore of an accumulator body 10-440 that is rigidly connected to the actuator body 10-404. A small annular gap 10-442 may exist between the outside of the accumulator body 10-440 and the actuator body 10-404 that is in fluid communication with the compression chamber, and hence is at the same pressure (or near same pressure) as the accumulator, thereby negating or reducing the pressure drop between the inside and outside of the accumulator body. This arrangement allows for the use a thin wall accumulator body, without the body dilating under pressure from the pre-charged nitrogen.

While an internal accumulator has been depicted, any appropriate structure, device, or compressible medium capable of accommodating a change in the fluid volume present within the actuator 10-404, including an externally located accumulator, might be used, and while the accumulator is depicted being in fluid communication with the compression chamber, the accumulator could be in fluid communication with the extension chamber, as the disclosure is not so limited.

The compact nature and size of the electro-hydraulic actuator enables the electro-hydraulic actuator to be readily installed into a cabin stabilization application.

Figure 5:
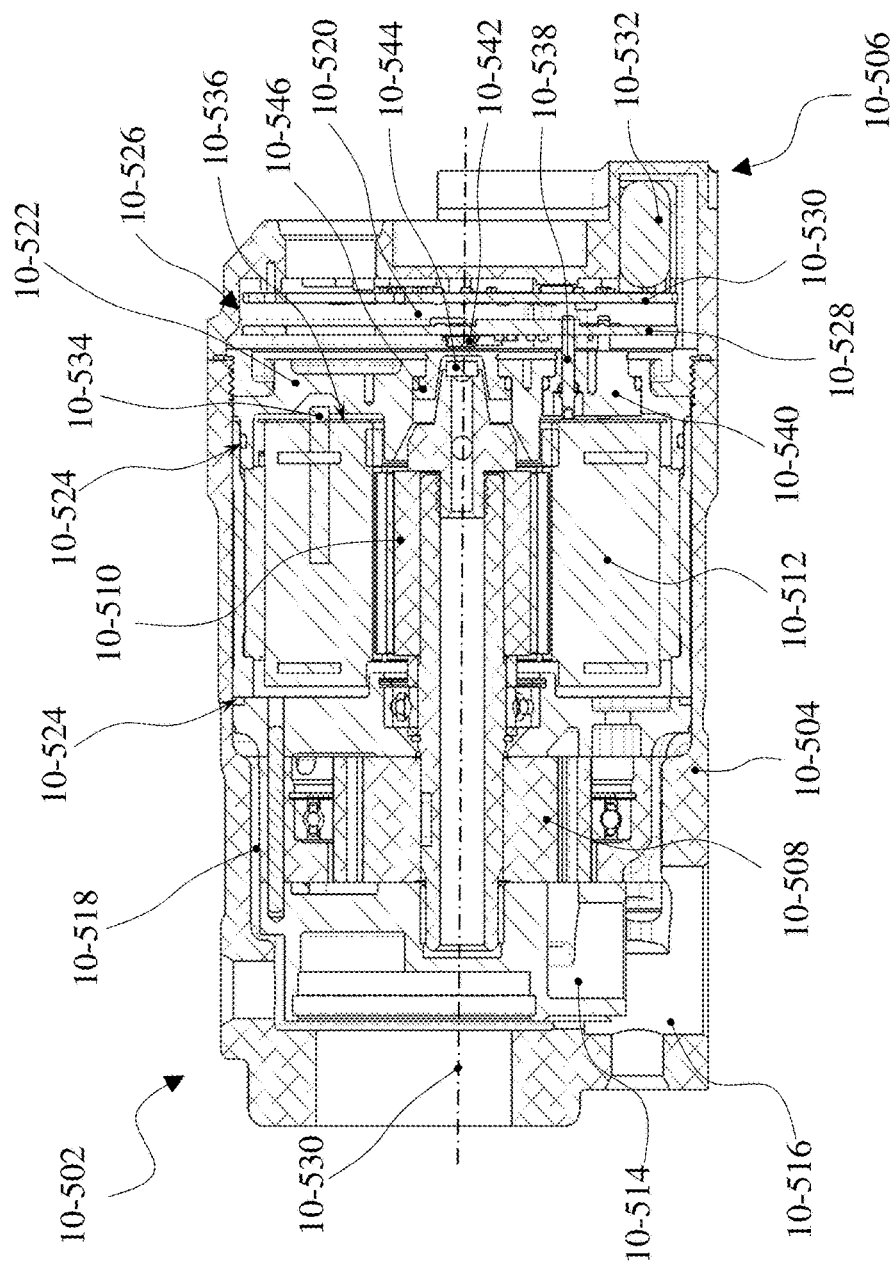
FIG. 5 is an embodiment of a regenerative active/semi-active smart valve.

FIG. 5 shows an embodiment of an electro-hydraulic regenerative/active smart valve 10-502, as disclosed in the embodiment of FIG. 4, comprising a fluid filled housing 10-504 coupled with the control housing 10-506, wherein the control housing is integrated with the electro-hydraulic regenerative/active smart valve 10-502. The smart valve assembly comprises a hydraulic pump/motor assembly (HSU) 10-508 closely coupled and operatively connected to a rotor 10-510 of an electric motor/generator, wherein the stator 10-512 of the electric motor/generator is rigidly located to the body of the smart valve assembly 10-502. The HSU comprises of a first port 10-514 that is in fluid communication with a first chamber of the actuator and a second port 10-516 that is in fluid communication with a second chamber of the actuator, wherein the second port 10-516 is also in fluid communication with fluid 10-518 that is contained within the volume of the housing 10-504. The HSU and electric motor/generator assembly is contained within and operates within the fluid 10-518 that is within the fluid filled housing 10-504. For reasons of reliability and durability the electric motor/generator may be of the BLDC type (although other type of motor are anticipated), whereby electric commutation is carried out via the electronic controller and control protocols, as opposed to using mechanical means for commutation (such as brushes for example), which may not remain reliable in an oil filled environment. As the fluid 10-518 is in fluid communication with the second port 10-516 of the HSU 10-508, any pressure that is present at the second port of the HSU will also be present in the fluid 10-518. The fluid pressure at the second port may be generated by the pressure drop that exists across the HSU (and hence across the piston of the actuator of the embodiment of FIG. 4) and may change accordingly with the pressure drop (and hence force) across the piston. The pressure at the second port may also be present due to a pre-charge pressure that may exist due to a pressurized reservoir (that may exist to account for the rod volume that is introduced or removed from the working volume of the actuator as the piston and piston rod strokes, for example). This pre-charge pressure may fluctuate with stroke position, with temperature or with a combination of both. The pressure at the second port may also be generated as a combination of the pressure drop across the HSU and the pre-charge pressure.

The control housing 10-506 is integrated with the smart valve body 10-502 and comprises a controller cavity 10-520. The controller cavity 10-520 is separated from the hydraulic fluid 10-518 that is contained within the housing 10-504 by a bulkhead 10-522 whereby the pressure within controller cavity 10-520 is at atmospheric (or near atmospheric) pressure. The bulkhead 10-522 contains the fluid 10-518 within the fluid-filled housing 10-504, by a seal(s) 10-524, acting as a pressure barrier between the fluid-filled housing and the control cavity. The control housing 10-506 comprises a controller assembly 10-526 wherein, the electronic controller assembly may comprise of a logic board 10-528, a power board 10-530, and a capacitor 10-532 among other components. The controller assembly is rigidly connected to the control housing 10-506. The electric motor/generator stator 10-512 comprises winding electrical terminations 10-534, and these terminations are electrically connected to a flexible electrical connection (such as a flex PCB for example) 10-536 that is electrical communication with an electronic connector 10-538. The electronic connector 10-538 passes through the bulkhead 10-522, while containing the hydraulic fluid 10-518 that is in the fluid filled housing via a sealed pass-through 10-540.

As the bulkhead 10-522 contains the fluid 10-518 within the fluid filled housing 10-504, the bulkhead is subjected to the pressure of the fluid 10-518, and hence the pressure of the second port 10-516 of the HSU, on the fluid side of the bulkhead, and the bulkhead is subjected to atmospheric (or near atmospheric) pressure on the controller cavity side of the bulkhead. This may create a pressure differential across the bulkhead which may cause the bulkhead to deflect. Even if the bulkhead is constructed from a strong and stiff material (such as steel for example), any change in the pressure differential between the fluid 10-518 and the controller cavity 10-520 may cause a change in the deflection of the bulkhead. As the sealed pass-through 10-540 passes through the bulkhead, any change in deflection of the bulkhead may impart a motion on the sealed pass-through, which may in turn impart a motion on the electronic connector 10-538, that is contained within the sealed pass-through. The flexible electrical connection 10-536 is adapted so that it can absorb any motions that may exist between the electrical connector 10-538 and the winding electrical terminations 10-534 so that the connections between the winding electrical terminations 10-534 and the flexible electrical connection 10-536 and between flexible electrical connection 10-536 and the electronic connector 10-538 do not become fatigued over time which may cause these connections to fail.

The electrical connector 10-538 is in electrical connection with the power board 10-530 via another compliant electrical member (not shown). The compliant electrical member is adapted so that it can absorb any motions that may exist between the electrical connector 10-538 and the power board 10-530 so that the connections between the power board 10-530 and the compliant electrical member and between compliant electrical member and the electronic connector 10-538 do not become fatigued over time which may cause these connections to fail.

The control housing 10-506 comprises the control assembly 10-526 which may be comprised of a logic board, a power board, capacitors and other electronic components such as FETs or IGBTs. To offer an efficient means of heat dissipation for the control assembly 10-526, the control housing 10-506 may act as a heat sink, and may be constructed from a material that offers good thermal conductivity and mass (such as an aluminum or heat dissipating plastic for example). To ensure that an efficient heat dissipating capability is achieved by the control housing 10-506, the power components of the control assembly 10-526 (such as the FETs or IGBTs) may be mounted flat and in close contact with the inside surface of the control housing 10-506 so that it may utilize this surface as a heat sink. The construction of the control housing 10-506 may be such that the heat sink surface may be in thermal isolation from the fluid filled housing 10-504, by constructing the housing from various materials by such methods as over-molding the heat sink surface material with a thermally nonconductive plastic that is in contact with the housing 10-504. Or conversely the control housing 10-506 may be constructed so that the heat sink surface may be thermally connected to the fluid filled housing 10-504. The heat sink feature of the control housing 10-506 may be adapted and optimized to use any ambient air flow that exists in the cabin installation to cool the thermal mass of the heat sink.

A rotary position sensor 10-542, that measures the rotational position of a source magnet 10-544 that is drivingly connected to the electric motor/generator rotor 10-510, is mounted directly to the logic board 10-528. The rotary position sensor may be of a Hall effect type or other type. A non-magnetic sensor shield 10-546 is located within the bulkhead and lies in between the source magnet 10-544 and the rotary position sensor 10-542, whereby the sensor shield contains the fluid 10-518 that is in the fluid filled housing while allowing the magnetic flux of the source magnet 10-544 to pass through unimpeded so that it can be detected by the rotary position sensor 10-542 so that it can detect the angular position of the rotor 10-510.

The signal from the rotary position sensor 10-542 may be used by the electronic controller for commutation of the BLDC motor as well as for other functions such as for the use in a hydraulic ripple cancellation algorithm (or protocol); all positive displacement hydraulic pumps and motors (HSUs) produce a pressure pulsation that is in relation to its rotational position. This pressure pulsation is generated because the HSU does not supply an even flow per revolution, the HSU produces a flow pulsation per revolution, whereby at certain positions the HSU delivers more flow than its nominal theoretical flow per rev. (i.e. an additional flow) and at other position the HSU delivers less flow than its nominal theoretical flow per rev. (i.e. a negative flow). The profile of the flow pulsation (or ripple) is known with respect to the rotary position of the HSU. This flow ripple then in turn generates a pressure ripple in the system due to the inertia of the rotational components and the mass of the fluid etc. and this pressure pulsation can produce undesirable noise and force pulsations in downstream actuators etc. Since the profile of the pressure pulsation can be determined relative to the pump position, and hence the rotor and hence the source magnet position, it is possible for the controller to use a protocol that can vary the motor current and hence the motor torque based upon the rotor position signal to counteract these pressure pulsations, thereby mitigating or reducing the pressure pulsations and hence reducing the hydraulic noise and improving the performance of the system. Another method of reducing hydraulic ripple from the HSU may be in the use of a port timed accumulator buffer. In this arrangement the HSU comprises ports that are timed in accordance with the HSU flow ripple signature so that in positions when the HSU delivers more flow than its nominal (i.e. an additional flow) a port is opened from the HSU first port to a chamber that comprises a compressible medium so that there is fluid flow from the HSU to the chamber to accommodate this additional flow, and at positions when the HSU delivers less flow than its nominal (i.e. a negative flow) a port is opened from the HSU first port to the reservoir that comprises a compressible medium so that the fluid can flow from the reservoir to the HSU first port, to make up for the negative flow. The chamber with the compressible medium thereby buffers out the flow pulsations and hence the pressure pulsations from the HSU. It is possible to use the hydraulic ripple cancellation algorithm described earlier with the port timed accumulator buffer described above to further reduce the pressure ripple and noise signature of the HSU thereby further improving the performance of the smart valve.

The invention claimed is:

1. A commercial vehicle cabin stabilization system comprising:
   a vehicle chassis, a vehicle cabin, and a plurality of electro-hydraulic actuators, each actuator comprising:
      a housing comprising an extension volume and a compression volume;
      a piston that separates the extension volume and the compression volume;
      a valve that controls at least a portion of fluid flow to or from at least one of the compression volume and the extension volume during at least at one operating point;
      an accumulator having a volume that receives fluid from at least one of the compression volume and the extension volume during least at one operating point;
      an electric motor operatively coupled to a hydraulic pump; and
      a closed hydraulic circuit, wherein each of the plurality of electro-hydraulic actuators is disposed between a structural member of the chassis and the cabin;
   at least one sensor adapted to sense movement along at least one axis of at least one of cabin and the chassis; and
   at least one controller constructed and arranged to operate at least one of the plurality of electro-hydraulic actuators in response to the sensed movement to isolate at least a portion of the chassis movement from the cabin.

2. The system of claim 1, wherein a control program running in the controller causes current to flow through the electric motor to at least one of induce rotation of the hydraulic pump thereby inducing hydraulic fluid flow through the actuator and retard rotation of the hydraulic pump thereby reducing movement of the actuator.

3. The system of claim 1, wherein each electro-hydraulic actuator is self-controllable and further comprises a dedicated controller and each dedicated controller executes a control program.

4. The system of claim 1, wherein at least one electro-hydraulic actuator operates to control at least one of roll, pitch, and heave of the cabin.

5. The system of claim 1, wherein at least one electro-hydraulic actuator is disposed perpendicular to the vehicle chassis and cabin.

6. The system of claim 1, wherein at least one electro-hydraulic actuator is disposed at a non-perpendicular angle between the chassis and cabin.

7. The system of claim 1, wherein the system can control fore and aft motion of the cabin.

8. The system of claim 1, wherein the plurality of sensors are adapted to detect acceleration along at least two axes.

9. The system of claim 1, wherein the plurality of sensors are feed-forward sensors and adapted to detect at least one of steering angle, brake application, and throttle.

10. The system of claim 1, wherein at least one of the plurality of sensors comprises a sensor to detect movement of an operator's seat disposed in the cabin.

11. The system of claim 1, wherein the cabin is a front hinged cabin and the plurality of electro-hydraulic actuators comprises at least two actuators operatively connected to the rear of the cabin.

12. The system of claim 1, wherein the cabin is four-point suspended cabin and the plurality of electro-hydraulic actuators comprises at least one actuator operatively connected to each corner of the cabin.

13. The system of claim 1, further comprising at least one actuator disposed between an operator's seat and the cabin, wherein a controller for the at least one seat actuator communicates with the at least one dedicated controller of at least one of the plurality of electro-hydraulic actuators.

14. The system of claim 1, wherein energy is consumed by the actuator in response to a commanded force.

15. The system of claim 1, wherein the hydraulic pump is operated at least at one operating point as a hydraulic motor.

16. A vehicle cabin stabilization system comprising:
   a vehicle chassis, a vehicle cabin and a plurality of electro-hydraulic actuators, each actuator comprising:
      a housing comprising a compression volume and an extension volume separated by a piston;
      a valve that controls at least a portion of fluid flow to or from at least one of the compression volume and the extension volume during at least at one operating point;
      an accumulator having a volume that receives fluid from at least one of the compression volume and the extension volume during at least at one operation point;

an electric motor operatively coupled to a hydraulic pump; and a closed hydraulic circuit, wherein each of the plurality of electro-hydraulic actuators is disposed between a structural member of the chassis and the cabin;

at least one sensor for determining movement of the vehicle along at least two axes; and a controller constructed and arranged to operate the plurality of electro-hydraulic actuators in response to the sensed vehicle movement, wherein the plurality of electro-hydraulic actuators cooperatively operate to isolate at least a portion of at least one of pitch, roll, and heave motions of the cabin from the determined vehicle movement.

17. The system of claim 16, wherein the at least one sensor is disposed to sense movement of at least one structure of the vehicle selected from the group consisting of the chassis, a wheel, a seat, and the cabin.

18. The system of claim 16, wherein a control program causes current to flow through the electric motor of at least one electro-hydraulic actuator to at least one of induce rotation of the hydraulic pump, thereby inducing hydraulic fluid flow through the actuator, and retard rotation of the hydraulic pump, thereby reducing movement of the actuator.

19. The system of claim 16, wherein each actuator is self-controllable and further comprises a dedicated controller and each dedicated controller executes a control program.

20. The system of claim 16, wherein at least one electro-hydraulic actuator is disposed perpendicular to the vehicle chassis and cabin.

21. The system of claim 16, wherein at least one electro-hydraulic actuator is disposed at a non-perpendicular angle between the chassis and cabin.

22. The system of claim 16, wherein the system is further configured to control fore and aft motion of the cabin.

23. The system of claim 16, wherein the plurality of sensors are feed-forward sensors and adapted to detect at least one of steering angle, brake application, and throttle.

24. The system of claim 16, further comprising a sensor that detects movement of an operator's seat.

25. The system of claim 16, wherein the cabin is a front hinged cabin and the plurality of electro-hydraulic actuators comprises two actuators operatively connected to the rear of the cabin.

26. The system of claim 16, wherein the cabin has four corners and is a four-point suspended cabin and the plurality of electro-hydraulic actuators comprises at least one actuator operatively connected to each corner of the cabin.

27. The system of claim 16, further comprising a cabin stabilization system controller and at least one actuator disposed between an operator's seat and the cabin, wherein a controller for the at least one seat actuator communicates with the cabin stabilization system controller.

28. The system of claim 16, wherein energy is consumed in the actuator in response to a command force.

29. The system of claim 16, wherein the hydraulic pump is operated at least at one operating point as a hydraulic motor.

30. A method of secondary vehicle suspension, comprising:

sensing movement at one of a plurality of self-controllable electro-hydraulic actuators disposed between a structural member of a vehicle chassis and a structural member of a cabin of the vehicle, wherein each of the plurality of self-controllable actuators includes a housing comprising an extension volume and a compression volume separated by a piston, a controller, an accumulator, a hydraulic pump, and an electric motor;

controlling at least a portion of fluid flow from at least one of the extension volume and the compression volume with a valve during at least at one operating point;

receiving fluid flow in the accumulator from at least one of the extension volume and the compression volume during at least at one operating point; and responding to the sensed movement to mitigate impact of the sensed movement on the cabin by applying current to at least one electric motor in at least one of the plurality of self-controllable actuators to control flow of hydraulic fluid in the at least one of the plurality of self-controllable electro-hydraulic actuators by at least one of resisting rotation of the hydraulic pump that engages the hydraulic fluid and assisting rotation of the hydraulic pump that engages the hydraulic fluid.

31. The system of claim 30, wherein the electric motor is at least partially immersed in hydraulic fluid.

32. The system of claim 30, wherein movement of the vehicle is measured for at least one of the cabin, the chassis, and the wheels.

33. The system of claim 30, wherein the hydraulic pump is operated at least at one operating point as a hydraulic motor.

34. A method of secondary vehicle suspension, comprising:

sensing movement at one of a plurality of self-controllable electro-hydraulic actuators disposed between a structural member of a vehicle chassis and a structural member of a cabin of the vehicle, wherein each electro-hydraulic actuator has a closed hydraulic circuit, an electric motor operatively coupled to a hydraulic pump, a housing comprising an extension volume and a compression volume separated by a piston, and an accumulator;

controlling at least a portion of fluid flow from at least one of the extension volume and the compression volume with a valve during at least at one operating point;

receiving fluid flow in the accumulator from at least one of the extension volume and the compression volume during at least at one operating point; and responding to the movement by controlling rotation of the hydraulic pump of the one of the plurality of self-controllable electro-hydraulic actuators based on information about the sensed movement, wherein rotation of the hydraulic pump at least partially determines a hydraulic fluid pressure in the one of the plurality of self-controllable electro-hydraulic actuators.

35. The system of claim 34, wherein at least one of the plurality of self-controllable electro-hydraulic actuators responds independently to the sensed movement.

36. The system of claim 34, wherein each of the plurality of self-controllable electrohydraulic actuators comprises at least one local sensor to sense movement of the vehicle.

37. The system of claim 34, wherein each of the plurality of self-controllable electrohydraulic actuators responds cooperatively to the sensed movement by communicating with at least one other of the plurality of self-controllable electro-hydraulic actuators.

38. The system of claim 34, wherein the hydraulic pump is operated at least at one operating point as a hydraulic motor.

39. A method of secondary vehicle suspension, comprising:

sensing movement of a vehicle chassis;

predicting a movement of a cabin of the vehicle based on the sensed movement of the chassis; and operating a plurality of self-controllable electro-hydraulic actuators disposed between a structural member of the vehicle chassis and a structural member of the cabin to counteract a portion of the predicted movement of the cabin that impacts at least one of roll, pitch and heave of the cabin, wherein each of the plurality of self-controllable electro-hydraulic actuators includes a housing comprising an extension volume and a compression volume separated by a piston, and a accumulator;

controlling at least a portion of fluid flow from at least one of the extension volume and compression volume with a valve during at least at one operating point; and receiving fluid flow in the accumulator from at least one of the extension volume and the compression volume during at least at one operating point.

40. The system of claim 39, wherein controlling comprises applying current to at least one electric motor that controls movement of hydraulic fluid through one of the plurality of actuators by at least one of resisting and assisting rotation of a hydraulic pump that engages the hydraulic fluid.

41. A method of secondary vehicle suspension, comprising:

sensing movement of a vehicle cabin using at least one of an accelerometer, a gyroscope, and a position sensor; and operating a plurality of self-controllable electro-hydraulic actuators disposed between a structural member of the vehicle chassis and a structural member of the cabin to counteract a portion of the sensed cabin movement in the roll, pitch and heave modes of the cabin wherein each electro-hydraulic actuator has a housing comprising an extension volume and a compression volume separated by a piston, an accumulator, a closed hydraulic circuit and an electric motor operatively coupled to a hydraulic pump;

controlling at least a portion of fluid flow from at least one of the extension volume and the compression volume with a valve during at least at one operating point; and receiving fluid flow in the accumulator from at least one of the extension volume and the compression volume during at least at one operating point.

42. The system of claim 41, wherein controlling comprises applying current to at least one electric motor that controls movement of hydraulic fluid through one of the plurality of actuators by at least one of resisting and assisting rotation of a hydraulic pump that engages the hydraulic fluid.

43. A method of secondary vehicle suspension, comprising:

operating a first controllable actuator disposed between a first structure of a vehicle and a second structure of the vehicle to control at least one aspect of relative motion of the first structure with respect to the second structure; and operating a second controllable actuator disposed between the second structure and a third structure of the vehicle to control at least one aspect of relative motion of the third structure with respect to the second structure, wherein at least two of the first, second, and third structures are structures other than a wheel assembly, and wherein electrical energy provided to at least one of the first controllable actuator and the second controllable actuator is converted to mechanical energy by the actuator.

44. The method of claim 43, wherein the vehicle is a truck, the first structure is a wheel of the truck, the second structure is a structural element of the truck chassis and the third structure is a cabin of the truck.

45. The method of claim 43, wherein the vehicle is a truck, the first structure is a structural element of the truck chassis, the second structure is a cabin of the truck and the third structure is a driver's seat in the cabin.

46. The method of claim 43, wherein the first and the second controllable actuators are self-controllable.

47. The method of claim 43, wherein the first structure is a wheel of the vehicle, the second structure is a structural element of the vehicle chassis and the third structure is a passenger compartment of the vehicle.

48. The method of claim 43, wherein at least one of the first controllable actuator and the second controllable actuator is self-controllable.

* * * * *

UNITED STATES PATENT AND TRADEMARK OFFICE
CERTIFICATE OF CORRECTION

PATENT NO. : 9,707,814 B2  
APPLICATION NO. : 14/242658  
DATED : July 18, 2017  
INVENTOR(S) : Richard Anthony Zuckerman et al.

It is certified that error appears in the above-identified patent and that said Letters Patent is hereby corrected as shown below:

In the Claims

At Column 13, Line 62, Claim 1 – after "during" please insert -- at --

At Column 14, Line 2, Claim 1 – after "of" (second occurrence) please insert -- the --

At Column 17, Line 11, Claim 39 – please delete "a" (second occurrence) and replace with -- an --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*